United States Patent
Morishige et al.

(10) Patent No.: US 10,060,471 B2
(45) Date of Patent: Aug. 28, 2018

(54) THRUST SLIDING BEARING

(71) Applicant: OILES CORPORATION, Tokyo (JP)

(72) Inventors: Kouichi Morishige, Fujisawa (JP); Wataru Nishioka, Fujisawa (JP); Tsuyoshi Nagashima, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 15/309,844

(22) PCT Filed: Apr. 21, 2015

(86) PCT No.: PCT/JP2015/062155
§ 371 (c)(1),
(2) Date: Nov. 9, 2016

(87) PCT Pub. No.: WO2015/170586
PCT Pub. Date: Nov. 12, 2015

(65) Prior Publication Data
US 2017/0146056 A1    May 25, 2017

(30) Foreign Application Priority Data

May 9, 2014    (JP) ................................ 2014-097845

(51) Int. Cl.
*F16C 17/04*    (2006.01)
*F16C 17/10*    (2006.01)
(Continued)

(52) U.S. Cl.
CPC .............. *F16C 17/10* (2013.01); *F16C 33/10* (2013.01); *F16C 33/74* (2013.01)

(58) Field of Classification Search
CPC ....................................................... F16C 17/04
See application file for complete search history.

(56) References Cited

U.S. PATENT DOCUMENTS

| 7,198,406 B2 * | 4/2007 | Watai ..................... B60G 11/16 384/368 |
| 8,851,762 B2 * | 10/2014 | Corbett ................ B60G 15/068 384/609 |

(Continued)

FOREIGN PATENT DOCUMENTS

| CN | 1688826 | 10/2005 |
| CN | 104052184 | 9/2014 |

(Continued)

OTHER PUBLICATIONS

International Search Report for PCT/JP2015/062155, dated Jul. 21, 2015, 5 pages.
(Continued)

*Primary Examiner* — Thomas R Hannon
(74) *Attorney, Agent, or Firm* — Nixon & Vanderhye P.C.

(57) ABSTRACT

Provided is a thrust sliding bearing which, while allowing a shaft member to smoothly rotate, can support for a long period of time a thrust load acting on the shaft member. A thrust sliding bearing comprises: an upper case (2) mounted to an upper support for mounting a strut-type suspension to a vehicle body; a lower case (3) mounted to an upper spring seat for supporting the upper end of the coil spring of the strut-type suspension, the lower case (3) being combined with the upper case (2) to form an annular space (5); and an annular center plate (4) disposed in the annular space (5) and enables the relative rotation between the upper case (2) and the lower case (3). The annular space (5) is filled with lubricating grease. The center plate (4) comprises: a bearing surface (42) in slidable contact with the surface (27) to be supported of the upper case (2); and annular protrusions (47, 48) provided at the inner peripheral edge and the outer peripheral edge of the bearing surface (42) so as to extend in the circumferential direction of the center plate (4).

8 Claims, 5 Drawing Sheets

(51) Int. Cl.
*F16C 33/74* (2006.01)
*F16C 33/10* (2006.01)

(56) References Cited

U.S. PATENT DOCUMENTS

| | | | |
|---|---|---|---|
| 8,882,357 B2* | 11/2014 | Morishige | F16C 17/04 384/139 |
| 9,194,435 B2* | 11/2015 | Miyata | F16C 17/04 |
| 2004/0130115 A1 | 7/2004 | Kellam et al. | |
| 2006/0138721 A1 | 6/2006 | Kellam et al. | |
| 2006/0140523 A1 | 6/2006 | Miyata et al. | |
| 2006/0215944 A1 | 9/2006 | Watai et al. | |
| 2007/0237439 A1 | 10/2007 | Watai et al. | |
| 2008/0310780 A1 | 12/2008 | Watai et al. | |
| 2009/0180719 A1 | 7/2009 | Miyata et al. | |
| 2011/0101584 A1* | 5/2011 | Viault | B60G 15/068 267/221 |
| 2014/0119682 A1 | 5/2014 | Morishige et al. | |
| 2015/0354629 A1* | 12/2015 | Sakairi | F16C 17/10 384/420 |

FOREIGN PATENT DOCUMENTS

| | | |
|---|---|---|
| DE | 10 2010 025 372 | 12/2011 |
| EP | 1 469 212 | 10/2004 |
| EP | 2 679 843 | 1/2014 |
| EP | 2 693 067 | 2/2014 |
| EP | 3 181 930 | 6/2017 |
| JP | 1-141926 U | 9/1989 |
| JP | 11-0013768 | 1/1999 |
| JP | 2004-176728 | 6/2004 |
| JP | 2004-263720 | 9/2004 |
| JP | 2004-263769 | 9/2004 |
| JP | 2006-513374 | 4/2006 |
| JP | 2007-303613 | 11/2007 |
| JP | 2008-175349 | 7/2008 |
| JP | 2013-002603 | 1/2013 |
| JP | 2014-040869 | 3/2014 |
| WO | WO 2004/059181 | 7/2004 |
| WO | WO 2011/160877 | 12/2011 |

OTHER PUBLICATIONS

Extended European Search Resort issued in Appln. No. 15789058.3 dated Dec. 14, 2017.
Computer Translation of JP 2008-175349* published Jul. 31, 2008.
Computer Translation of JP 2014-040869* published Mar. 6, 2014.
Computer Translation of WO 2011/160877* published Dec. 29, 2011.
Chinese Office Action issued in Appln. No. 201580020637.X dated Jan. 19, 2018 (w/ translation).

* cited by examiner

THRUST SLIDING BEARING

This application is the U.S. national phase of International Application No. PCT/JP2015/062155 filed 21 Apr. 2015, which designated the U.S. and claims priority to JP Patent Application No. 2014-097845 filed 9 May 2014, the entire contents of each of which are hereby incorporated by reference.

TECHNICAL FIELD

The present invention relates to a thrust sliding bearing that supports a load applied to a shaft member in the thrust direction while allowing the shaft member to rotate, and in particular to a thrust sliding bearing that supports a load applied in the thrust direction to a strut-type suspension (McPherson strut) while allowing a strut assembly of the strut-type suspension to rotate.

BACKGROUND ART

A strut-type suspension used for a front wheel of an automobile has structure in which a strut assembly is combined with a coil spring. This strut assembly comprises an external cylinder, which is integrated with a piston rod, and a hydraulic shock absorber housed in the external cylinder. When the steering is operated, the strut assembly is rotated together with the coil spring. Accordingly, for allowing smooth rotation of the strut assembly, a rolling bearing or a sliding bearing is placed as a thrust bearing between an upper support which is a mounting mechanism for mounting the strut assembly onto the automobile body and an upper spring seat which is a spring seat positioned at the upper end of the coil spring.

For example, the Patent Literature 1 discloses a sliding bearing made of synthetic resin as a thrust bearing for a strut-type suspension. This sliding bearing comprises: an upper case, which is attached to the side of an upper support; a lower case, which is attached to the side of an upper spring seat and rotatably combined with the upper case; and a center plate, which is placed in an annular space formed by combination of the upper case and the lower case and functions as a bearing body realizing smooth rotation between the upper case and the lower case. Here, the annular space formed by the combination of the upper case and the lower case is filled with lubricating grease. Further, in a bearing surface of the center plate, are formed, as lubricating grease reservoirs, an annular groove located on the radially inner side of the bearing surface and a plurality of grooves extending radially outward from the annular groove to connect with the side surface.

CITATION LIST

Patent Literature

Patent Literature 1: Japanese Unexamined Patent Application Laid-Open No. 11-013768

SUMMARY OF INVENTION

Technical Problem

When, however, the sliding bearing described in the Patent Literature 1 is used as a thrust bearing for a strut-type suspension, there arises the following problem. That is, when a load is applied in the thrust direction of the strut-type suspension, a bearing surface of the center plate and a support object surface provided in the upper case or the lower case are pressed against each other. By this, the lubricating grease on the bearing surface is pushed out of the side surface of the center plate through the lubricating grease reservoir grooves. As a result, sometimes this produces a part of bearing surface where lubricating grease film is not formed. When, in this state, sliding movement is repeated between the bearing surface of the center plate and the support object surface provided in the upper case or the lower case, the bearing surface of the center plate is deformed because of frictional heat, and it is possible that the desired performance is not obtained.

The present invention has been made considering the above situation. An object of the present invention is to provide a thrust sliding bearing that can support a load applied to a shaft member in the thrust direction for a long period of time while allowing smooth rotation of the shaft member.

Solution to Problem

To solve the above problem, a thrust sliding bearing of the present invention has annular protrusions along circumferential direction of a center plate respectively at inner and outer peripheral edges of a bearing surface of the center plate, so that the area enclosed by these annular protrusions on the bearing surface holds lubricating grease. Here, the bearing surface may be provided with recesses that function as lubricating grease reservoirs.

For example, the present invention provides a thrust sliding bearing for supporting a load applied to a shaft member in a thrust direction while allowing rotation of the shaft member, comprising:

an upper case, which is to be mounted, in a state that the shaft member is inserted therein, on a mounting mechanism for mounting the shaft member on a support object;

a lower case, which is to be mounted, in a state that the shaft member is inserted therein, on a spring seat at an upper end of a coil spring combined with the shaft member, and which is rotatably combined with the upper case so that an annular space is formed between the lower case and the upper case; and an annular center plate, which is placed, in a state that the shaft member is inserted therein, in the annular space, and which functions as a bearing body for realizing relative rotation between the upper case and the lower case, wherein:

the annular space is filled with lubricating grease; and the center plate comprises:

a bearing surface to be in slidable contact with a support object surface of the upper case; and a pair of annular protrusions which are provided along circumferential direction of the center plate respectively at inner and outer peripheral edges of the bearing surface.

Advantageous Effects of Invention

According to the present invention, even when a load is applied in the thrust direction of the shaft member so that the bearing surface of the center plate and the support object surface of the upper case are pressed against each other, the lubricating grease can be held in the area enclosed by the pair of protrusions, and the whole surface of the bearing surface can be covered by the lubricating grease. Accordingly, it is possible to support a load applied to the shaft member in the thrust direction for a long term while allowing smooth rotation of the shaft member.

DESCRIPTION OF EMBODIMENTS

In the following, one embodiment of the present invention will be described.

Figure 1:
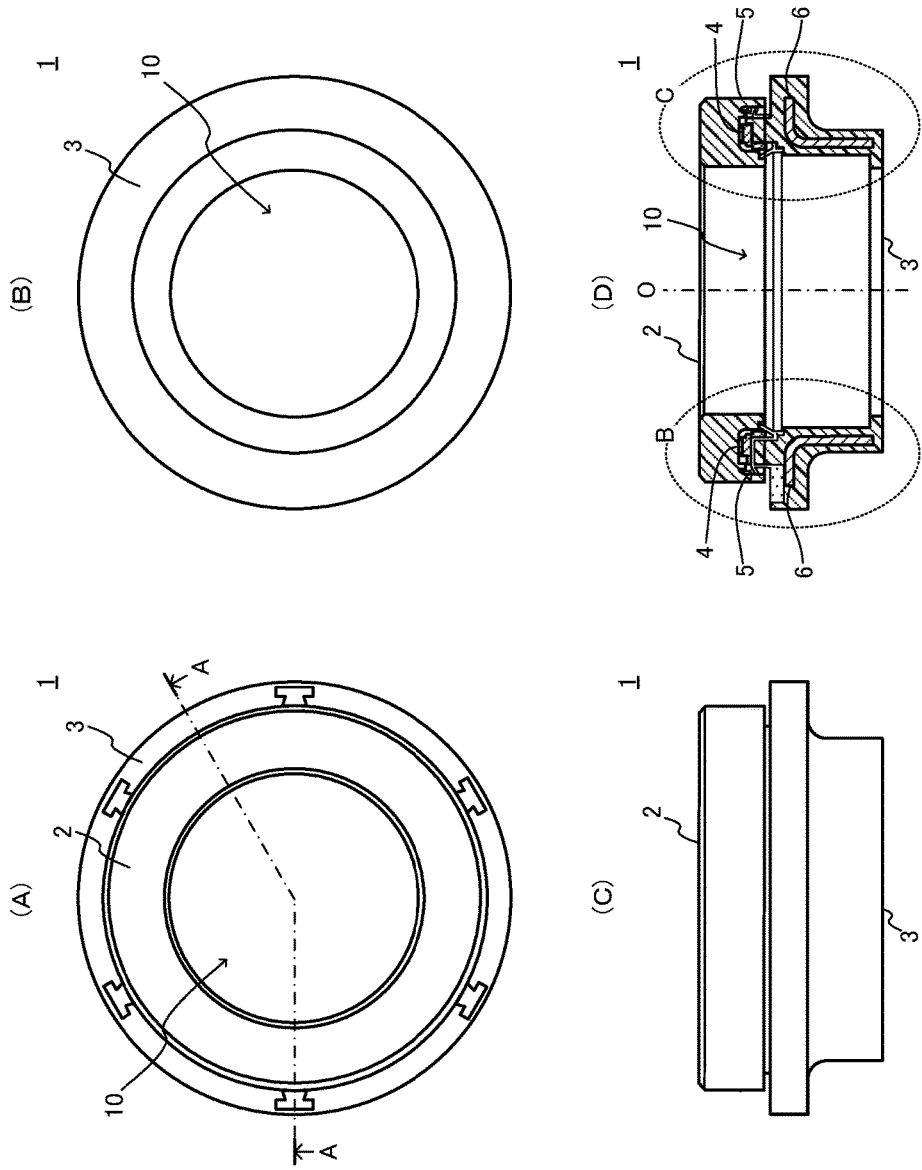
FIGS. 1(A), 1(B), and 1(C) are respectively a plan view, a bottom view, and a front view of a thrust sliding bearing 1 according to one embodiment of the present invention.
FIG. 1(D) is an A-A cross-section of the thrust sliding bearing 1 shown in FIG. 1(A)
Figure 2:
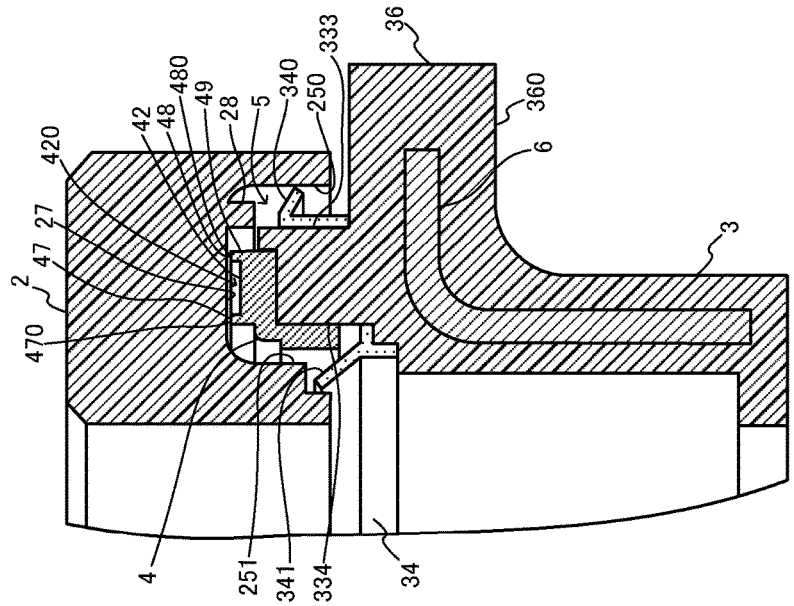
FIG. 2(A) is an enlarged view of the part B of the thrust sliding bearing 1 shown in FIG. 1(D)
FIG. 2(B) is an enlarged view of the part C of the thrust sliding bearing 1 shown in FIG. 1(D)
Figure 2:
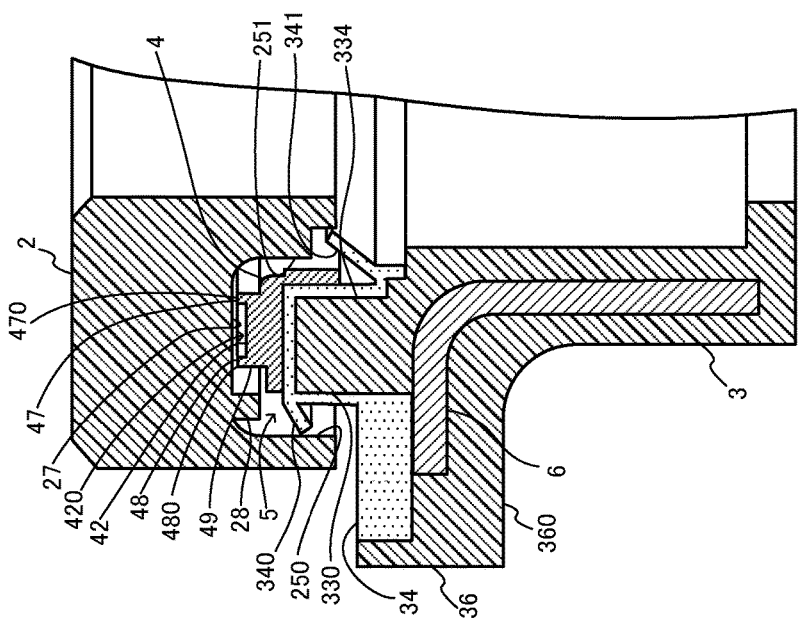

FIGS. 1(A), 1(B), and 1(C) are respectively a plan view, a bottom view, and a front view of a thrust sliding bearing 1 of the present embodiment, and FIG. 1(D) is an A-A cross-section of the thrust sliding bearing 1 shown in FIG. 1(A). Further, FIG. 2(A) is an enlarged view of the part B of the thrust sliding bearing 1 shown in FIG. 1(D), and FIG. 2(B) is an enlarged view of the part C of the thrust sliding bearing 1 shown in FIG. 1(D).

The thrust sliding bearing 1 of the present embodiment has a receiving hole 10 for receiving a strut assembly (not shown) of a strut-type suspension, and supports a load applied in the thrust direction of the strut-type suspension while allowing rotation of the strut assembly received in the receiving hole 10. As shown in the figures, the thrust sliding bearing 1 comprises: an upper case 2; a lower case 3, which is rotatably combined with the upper case 2 to form an annular space 5 between the upper case 2 and the lower case 3; an annular center plate 4 placed in the annular space 5; and lubricating grease (not shown) with which the annular space 5 is filled.

The upper case 2 is formed of thermoplastic resin excellent in sliding characteristics, such as polyacetal resin that is impregnated with lubricating oil if necessary. In a state that the strut assembly of the strut-type suspension is inserted in the upper case 2, the upper case 2 is attached to an upper support (not shown) that is a mounting mechanism for mounting the strut assembly on an automobile body.

Figure 3:
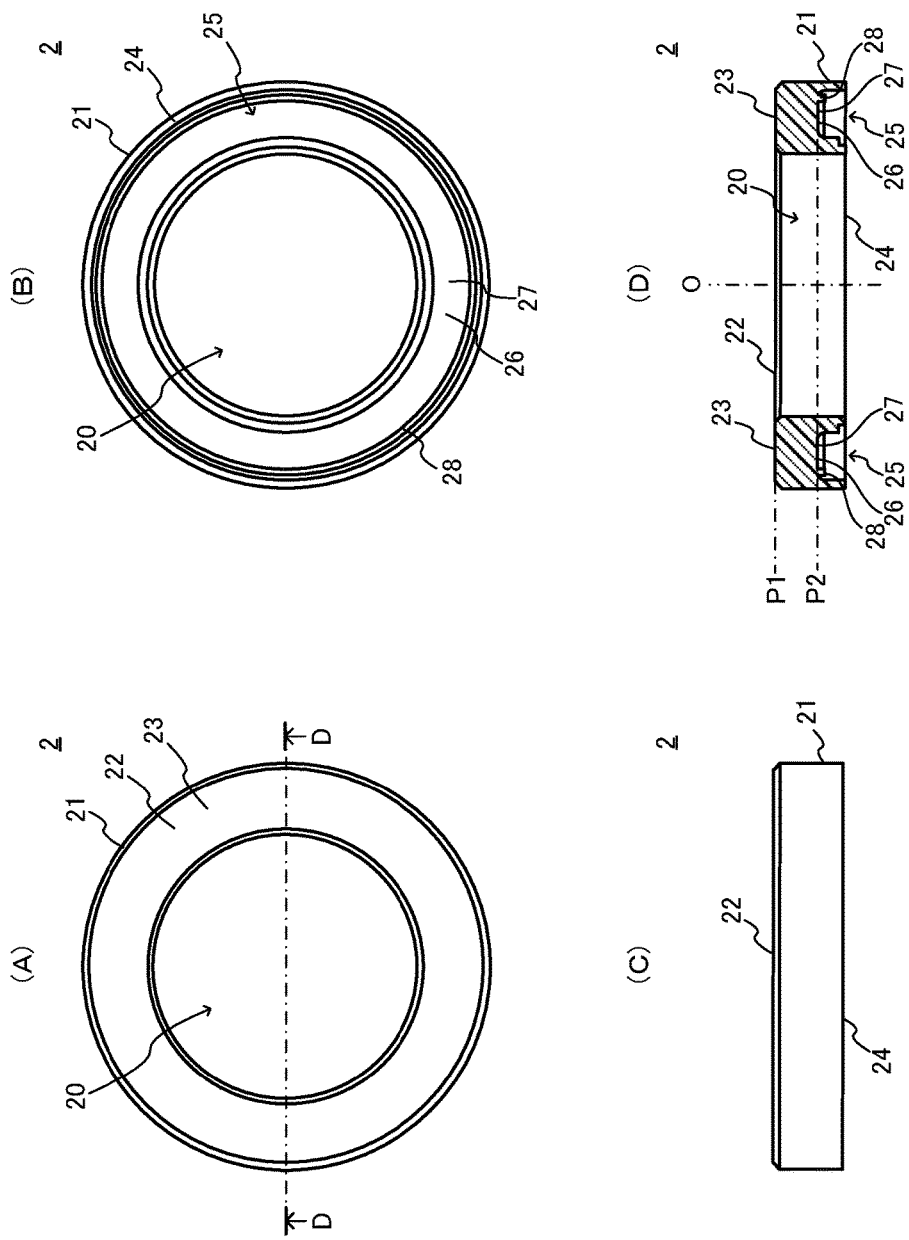
FIGS. 3(A), 3(B), and 3(C) are respectively a plan view, a bottom view, and a front view of the upper case 2.
FIG. 3(D) is a D-D cross-section of the upper case 2 shown in FIG. 3(A)

FIGS. 3(A), 3(B), and 3(C) are respectively a plan view, a bottom view, and a front view of the upper case 2, and FIG. 3(D) is a D-D cross-section of the upper case 2 shown in FIG. 3(A).

As shown in the figures, the upper case 2 comprises: an annular upper case body 21 having an insertion hole 20 for inserting the strut assembly therein; an attaching surface 23, which is formed in an upper surface 22 of the upper case body 21 and serves for attaching the thrust sliding bearing 1 to the upper support; an annular groove 25 formed in an lower surface 24 of the upper case body 21, which is opened on the side of the lower surface 24 and is closed on the side of the upper surface 22, so that an annular space 5 is formed by combining the annular groove 25 rotatably with the lower case 3; and an annular support object surface 27, which is formed in the groove bottom 26 and comes in slidable contact with the below-described bearing surface 42 of the center plate 4.

In the groove bottom 26 of the annular groove 25, an annular protrusion 28 protruding from the groove bottom 26 toward the lower surface 24 is formed on the side of the outer peripheral edge of the support object surface 27. This protrusion 28 encloses a side surface 49 of the center plate 4 on the outer periphery side of the center plate 4 placed in the annular groove 25, so as to prevent the lubricating grease filled in the annular space 5 from being pushed out radially from the bearing surface 41 of the center plate 4 when the load is applied in the thrust direction of the strut-type suspension.

The lower case 3 is an insert molded article that is a resin molded body of thermoplastic resin such as polyamide resin in which a steel plate 6 as a reinforcing member is embedded. This lower case 3 is mounted, in a state that the strut assembly is inserted in the lower case 3, on an upper spring seat (not shown) that is a spring seat placed at the upper end of the coil spring (not shown) of the strut-type suspension.

Figure 4:
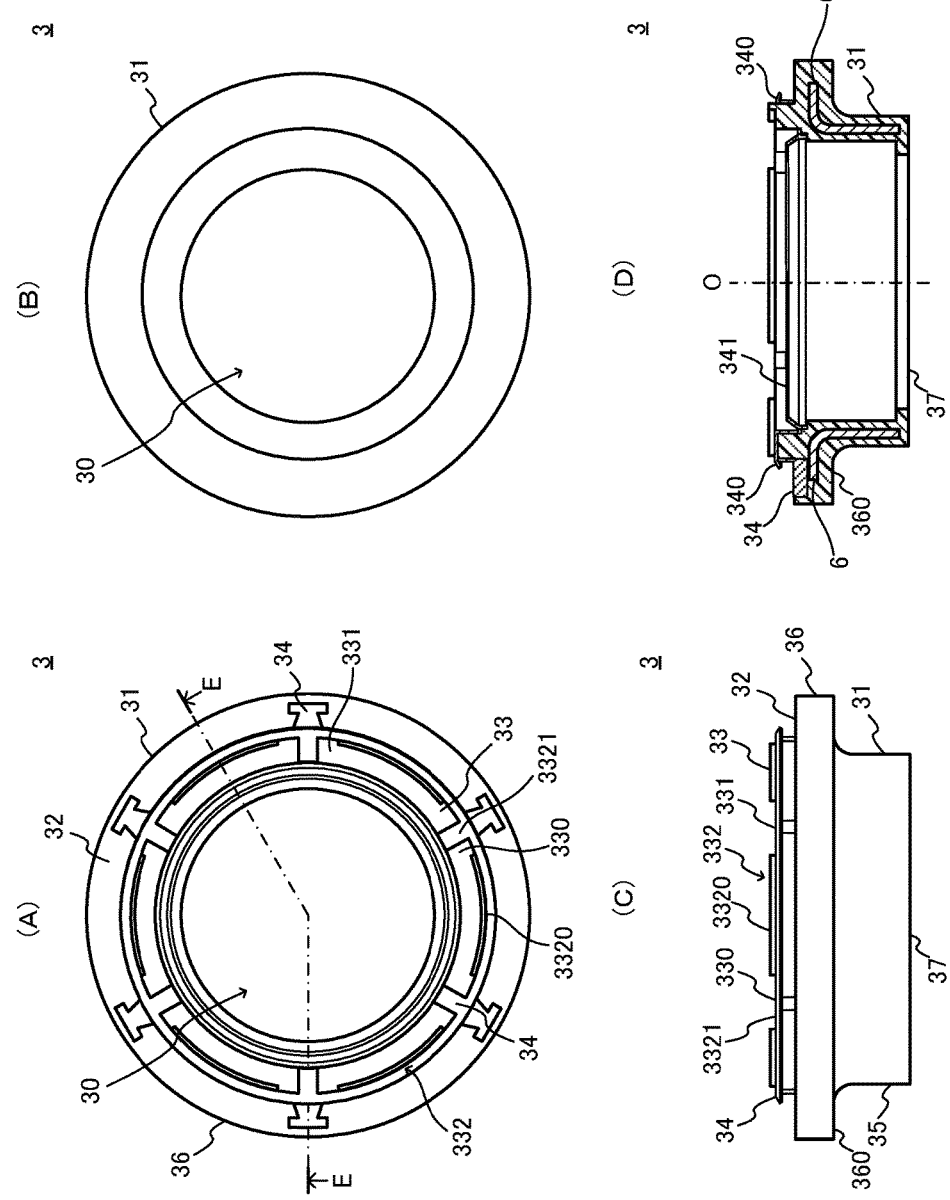
FIGS. 4(A), 4(B), and 4(C) are respectively a plan view, a bottom view, and a front view of the lower case 3.
FIG. 4(D) is an E-E cross-section of the lower case 3 shown in FIG. 4(A)

FIGS. 4(A), 4(B), and 4(C) are respectively a plan view, a bottom view, and a front view of the lower case 3, and FIG. 4(D) is an E-E cross-section of the lower case 3 shown in FIG. 4(A).

As shown in the figures, the lower case 3 comprises: a cylinder-shaped lower case body 31 having an insertion hole 30 wherein the strut assembly is to be inserted; an annular protrusion 33 formed on an upper surface 32 of the lower case body 31 along the inner peripheral surface of the lower case 3, which protrudes toward the upper case 2 and is inserted into the annular groove 25 formed in the lower surface 24 of the upper case body 21 of the upper case 2, so that the annular space 5 is formed when the lower case 3 is rotatably combined with the upper case 2; an annular dust seal 34 of elastic material such as urethane resin, which is mounted on the protrusion 33; and a flange 36 extending outward, which is provided in the side surface 35 of the lower case body 31.

In the upper surface 330 of the protrusion 33, a mounting surface 331 for mounting the center plate 4 is formed. Further, on the outer peripheral side of this mounting surface 331, a rotation lock 332 for preventing rotation of the center plate 4 mounted on the mounting surface 331 is formed. This rotation 332 lock has a circular shape along the outer peripheral surface of the protrusion 33, and has protrusions 3320 protruding toward the upper case 2 from the mounting surface 331 and non-protruding flat parts 3321, wherein the protrusions 3320 and the flat parts 3321 are positioned alternately.

The dust seal 34 is for preventing intrusion of foreign matter such as dust into the annular space 5. As shown in FIGS. 2(A) and 2(B), the dust seal 34 has lips 340 and 341. When the protrusion 33 of the lower case 3 is inserted in the annular groove 25 formed in the lower surface 24 of the upper case body 21 of the upper case 2, the lip 340 closes up the gap between the outer peripheral surface 333 of the protrusion 33 and the outer-periphery-side inner wall 250 of the annular groove 25, and the lip 341 closes up the gap between the inner peripheral surface 334 of the protrusion 33 and the inner-periphery-side inner wall 251 of the annular groove 25.

The flange 36 extends radially outward from the outer-periphery-side side surface 35 of the lower case body 31 on the side of the upper surface 32 of the lower case body 31. The lower surface 360 of the flange 36 is to be mounted on the upper spring seat.

The center plate 4 is formed of thermoplastic resin excellent in sliding characteristics such as polyolefin resin that is impregnated with lubricating oil if necessary. The center plate 4 is fixed on the mounting surface 331 of the protrusion 33 formed in the upper surface 32 of the lower-case body 31 of the lower case 3, and comes in sliding contact with the support object surface 27 of the annular groove 25 formed in the lower surface 24 of the upper case body 21 of the upper case 2. Accordingly the center plate 4 functions as a bearing body that realizes free rotation of the upper case 2 and the lower case 3 relative to each other.

Figure 5:
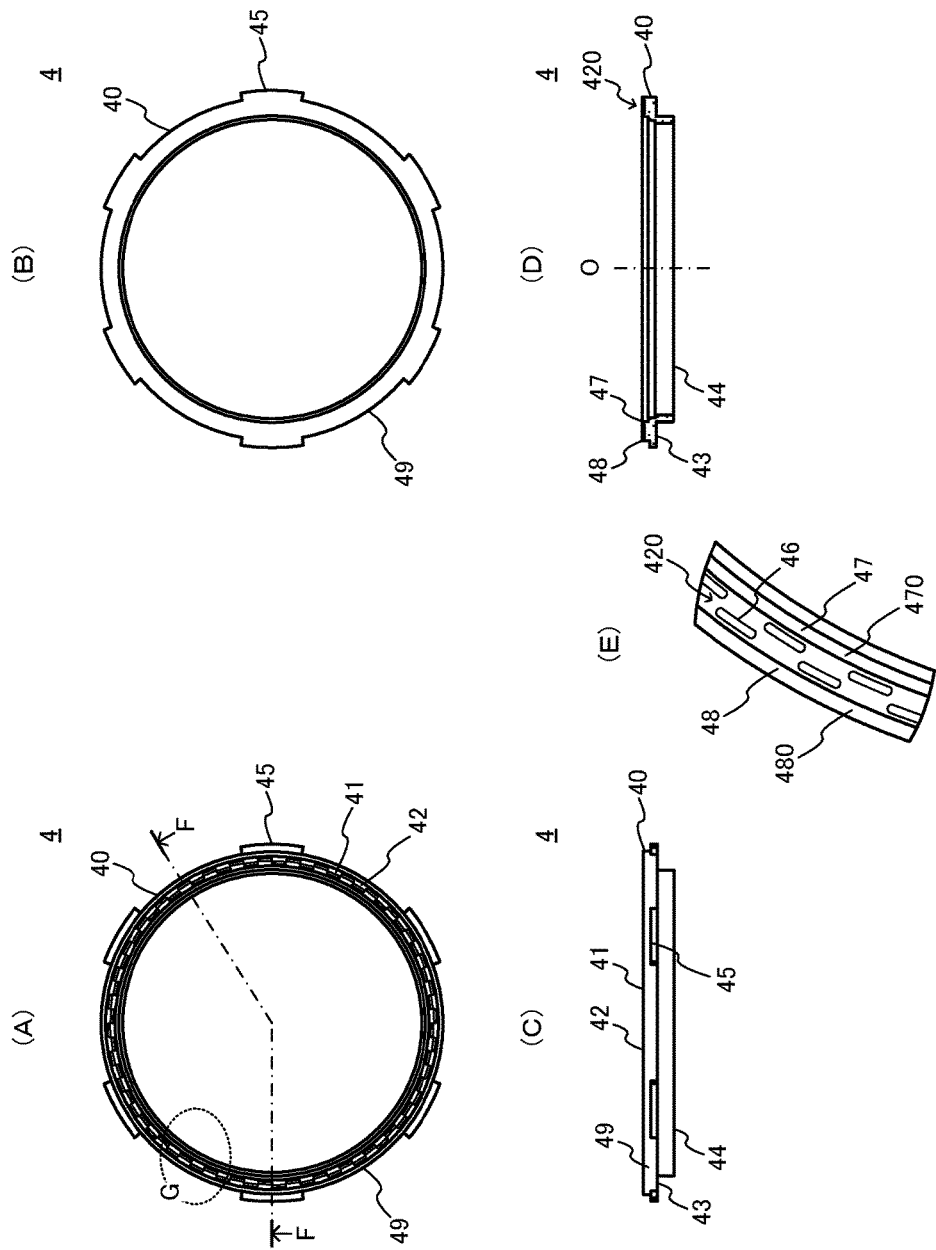
FIGS. 5(A), 5(B), and 5(C) are respectively a plan view, a bottom view, and a front view of the center plate 4.
FIG. 5(D) is an F-F cross-section of the center plate 4 shown in FIG. 5(A)
FIG. 5(E) is an enlarged view of the part G of the center plate 4 shown in FIG. 5(A).

FIGS. 5(A), 5(B), and 5(C) are respectively a plan view, a bottom view, and a front view of the center plate 4, FIG. 5(D) is an F-F cross-section of the center plate 4 shown in FIG. 5(A), and FIG. 5(E) is an enlarged view of the part G of the center plate 4 shown in FIG. 5(A).

As shown in the figures, the center plate 4 comprises: an annular center plate body 40; a bearing surface 42 formed in the upper surface 41 of the center plate body 40; an annular rib 44 formed to extend downward in the direction of the axial center O from the inner periphery side of the lower surface 43 of the center plate body 40; and a plurality of protruding rotation locks 45 that are formed along the circumferential direction of the lower surface 43 to protrude radially outward from the lower surface 43 of the center plate body 40.

When the center plate 4 is mounted on the lower case 3 such that the lower surface 43 of the center plate body 40 comes in contact with the mounting surface 331 of the annular protrusion 33 formed on the upper surface 32 of the lower case body 31 of the lower case 3, the annular rib 44 is inserted into the annular protrusion 33.

Further, when the center plate 4 is mounted on the lower case 3 such that the lower surface 43 of the center plate body 40 comes in contact with the mounting surface 331 of the annular protrusion 33 formed on the upper surface 32 of the lower case body 31 of the lowercase 3, each rotation lock 45 of the center plate 4 is positioned at a flat part 3321 of the rotation lock 332 provided in the annular protrusion 33 of the lower case 3, and engages with the protrusions 3320 positioned on both sides of the flat part 3321 in question so that relative rotation of the center plate 4 with respect to the lower case 3 is prevented.

On the bearing surface 42, a pair of annular protrusions 47 and 48 respectively are formed at the inner and outer peripheral edges along the circumferential direction of the center plate 4 so as to extend toward the upper case 2 from the bearing surface 42. Respective upper surfaces 470 and 480 of this pair of annular protrusions 47 and 48 come in slidable contact with the support object surface 27 of the annular groove 25 formed in the lower surface 24 of the upper case body 21 of the upper case 2. This makes the center plate 4 function as the bearing body that realizes free rotation between the upper case 2 and the lower case 3. Further, many recesses 46 functioning as lubricating grease reservoirs are formed in a central annular surface 420 lying between the pair of annular protrusions 47 and 48 of the bearing surface 42. Because the central annular surface 420 is enclosed by the pair of annular protrusions 47 and 48 at the inner and outer peripheral edges of the central annular surface 420, it is possible to hold more lubricating grease.

In the thrust sliding bearing 1 having the above-described constitution according to the present embodiment, the center plate 4 is mounted on the mounting surface 331 of the protrusion 33 formed on the upper surface 32 of the lower case body 31 of the lower case 3, and the protrusions 47 and 48 formed on the bearing surface 42 of the center plate 4 come in slidable contact with the support object surface 27 of the annular groove 25 formed in the lower surface 24 of the upper case body 21 of the upper case 2. Accordingly, the lower case 3 is rotatably combined with the upper case 4 via the center plate 4. As a result, the thrust sliding bearing 1 supports the load due to the strut-type suspension applied in the thrust direction through the upper spring seat attached to the back surface 360 of the flange 36 of the lower case 3 and the coil spring of the strut-type suspension, while allowing rotation of the strut assembly of the strut-type suspension inserted in the receiving hole 10.

Further, the thrust sliding bearing 1 of the present embodiment is provided with the annular protrusions 47 and 48 respectively at the inner and outer peripheral edges of the bearing surfaces 42 of the center plate 4 along the circumferential direction of the center plate 4. As a result, a part of lubricating grease filling the annular space 5 formed by combination of the upper case 2 and the lower case 3 is held in the area enclosed by these annular protrusions 47 and 48 on the bearing surface 42. Even in the case where a load is applied in the thrust direction of the strut-type suspension so that the protrusions 47 and 48 formed on the bearing surface 42 of the center plate 4 and the support object surface 7 of the upper case 2 are pressed against each other, the lubricating grease can be held in that area. Therefore, the whole surface of the bearing surface 42 can be covered by the lubricating grease film. Accordingly, it is possible to support the load applied in the thrust direction of the strut-type suspension while allowing smooth rotation of the strut assembly of the strut-type suspension for a long term.

Further, because the thrust sliding bearing 1 of the present embodiment has a plurality of recesses 46 functioning as lubricating grease reservoirs in the bearing surface 42 of the center plate 4, the area enclosed by the annular protrusions 47 and 48 on the bearing surface 42 can hold more lubricating grease. Accordingly, the upper surfaces 470 and 480 of the protrusions 47 and 48 of the bearing surface 42 can be covered more reliably by the lubricating grease film, and the load applied in the thrust direction of the strut-type suspension can be supported while allowing smooth rotation of the strut assembly of the strut-type suspension for long term.

Further, the thrust sliding bearing 1 of the present embodiment has the annular protrusion 28, which protrudes from the groove bottom 26 toward the lower case 3, in the groove bottom 26 of the annular groove 25 formed in the lower surface 24 of the upper case 2, so as to enclose the side surface 49 on the outer periphery side of the center plate 4 positioned in the annular space 5 formed by combination of the upper case 2 and the lower case 3. This protrusion 28 can prevent the lubricating grease filling the annular space 5 from being pushed out radially from the bearing surface 41 of the center plate 4 when the load is applied in the thrust direction of the strut-type suspension. Accordingly, the upper surfaces 470 and 480 of the protrusions 47 and 48 of the bearing surface 42 can covered more reliably by the lubricating grease film, and the load applied in the thrust direction of the strut-type suspension can be supported while allowing smooth rotation of the strut assembly of the strut-type suspension for a long term.

The present invention is not limited to the above-described embodiment, and can be variously modified within the scope of the invention.

For example, in the above-described embodiment, the center plate 4 is mounted and fixed on the lower case 3. However, the center plate 4 may be rotatably mounted on the lower case 3. Namely, a bearing surface may be formed in the lower surface 43 of the center plate 4 as well as in the upper surface 41 of the center plate 4, so that this bearing surface is made to come in sliding contact with the mounting surface 331 of the protrusion 33 formed on the upper surface 32 of the lower case body 31 of the lower case 3. In this case, similarly to the upper surface 41 of the center plate 4, annular protrusions may be provided respectively at the inner and outer peripheral edges of the bearing surface formed in the lower surface 43 of the center plate 4 along the circumferential direction of the center plate 4, so that the area enclosed by the bearing surface, the mounting surface 331, and these protrusions hold lubricating grease to cover the whole surface of the bearing surface. Further, a plurality of recesses functioning as lubricating grease reservoirs may be formed in the bearing surface so that the area concerned can hold more lubricating grease.

Further, in the above-described embodiment, the attaching surface 23 formed in the upper surface 22 of the upper case body 21 of the upper case 2 is made parallel to the support object surface 2 of the annular groove 25 formed in the lower surface 22 of the upper case body 21 of the upper case 2 (See P1 and P2 in FIG. 3(D)). As a result, the axis of rotation of the thrust sliding bearing 1 coincides with the strut axis of the strut-type suspension, and the steer moment generated around the axis of the kingpin is made larger, and thus the steering feeling is improved. However, the present invention is not limited to this. The angle between the attaching surface 23 of the upper case 2 and the support object surface 27 can be suitably determined depending on the performance required for the vehicle. For example, when the attaching surface 23 of the upper case 2 is inclined with respect to the support object surface 27 and the axis of rotation of the thrust sliding bearing 1 is inclined at an appropriate angle with respect to the strut axis of the strut-type suspension so that the axis of rotation of the thrust sliding bearing 1 is made closer to the axis of the kingpin, the steer moment generated around the axis of the kingpin becomes smaller. And the robustness against dispersion in production of coil springs for strut-type suspension can be improved.

The thrust sliding bearing of the present invention can be widely applied to a sliding bearing that supports a load applied to a shaft member while allowing rotation of the shaft member in various mechanisms including a strut-type suspension.

REFERENCE SIGNS LIST

1: thrust sliding bearing; 2: upper case; 3: lower case; 4: center plate; 5: annular space; 6: steel plate; 10: receiving hole of the thrust sliding bearing: 20: insertion hole of the upper case; 21: upper case body; 22: upper surface of the upper case body; 23: attaching surface of the upper case body; 24: lower surface of the upper case body; 25: annular groove of the upper case body; 26: groove bottom of the annular groove; 27: support object surface of the upper case body; 28: annular protrusion of the support object surface; 30: insertion hole of the lower case; 31: lower case body; 32: upper surface of the lower case body; 33: annular protrusion of the lower case body; 34: dust seal; 35: side surface of the lower case body; 36: flange of the lower case body; 37: lower surface of the lower case body; 40: center plate body; 41: upper surface of the center plate body; 42: bearing surface of the center plate body; 43: lower surface of the center plate body; 44: annular rib of the center plate body; 45: rotation lock of the center plate body; 46: recess of the bearing surface; 47, 48: annular protrusion of the bearing surface; 49: side surface on the outer periphery side of the center plate; 330: upper surface of the annular protrusion of the lower case body; 331: mounting surface of the lower case body; 332: rotation lock of the lower case body; 333: outer peripheral surface of the annular protrusion of lower case body; 334: inner peripheral surface of the annular protrusion of the lower case body; 340, 341: lip of the dust seal; 360: back surface of the flange; 420: central annular surface of the bearing surface; 470, 480: upper surface of annular protrusion of the bearing surface; 3320: protrusion of the rotation lock; and 3321: flat part of the rotation lock.

The invention claimed is:

1. A thrust sliding bearing for supporting a load applied to a shaft member in a thrust direction while allowing rotation of the shaft member, comprising:
    an upper case, which is to be mounted, in a state that the shaft member is inserted therein, on a mounting mechanism for mounting the shaft member on a support object;
    a lower case, which is to be mounted, in a state that the shaft member is inserted therein, on a spring seat at an upper end of a coil spring combined with the shaft member, and which is rotatably combined with the upper case so that an annular space is formed between the lower case and the upper case; and
    an annular center plate, which is placed, in a state that the shaft member is inserted therein, in the annular space, and which functions as a bearing body for realizing relative rotation between the upper case and the lower case, wherein:
    the annular space is filled with lubricating grease; and
    the center plate comprises:
    a bearing surface to be in slidable contact with a support object surface of the upper case;
    a pair of annular protrusions which are provided along circumferential direction of the center plate respectively at inner and outer peripheral edges of the bearing surface; and
    recesses formed in the bearing surface, and wherein:
    an area on the bearing surface enclosed by a pair of the annular protrusions is configured to be a first grease holding area; and
    the recesses are configured to be second grease holding areas.

2. A thrust sliding bearing of claim 1, further comprising:
    a seal member, which is placed between the upper case and the lower case, to isolate the annular space from outside.

3. A thrust sliding bearing of claim 1 wherein:
    the lower case is an insert molded article that is a resin molded body in which a steel plate is embedded as a reinforcing member.

4. A thrust sliding bearing of claim 3, further comprising:
    a seal member, which is placed between the upper case and the lower case, to isolate the annular space from outside.

5. A thrust sliding bearing of claim 1, wherein:
    the upper case comprises an annular protrusion that encloses an outer periphery of the center plate positioned in the annular space.

6. A thrust sliding bearing of claim 5, further comprising:
a seal member, which is placed between the upper case and the lower case, to isolate the annular space from outside.

7. A thrust sliding bearing of claim 5, wherein:
the lower case is an insert molded article that is a resin molded body in which a steel plate is embedded as a reinforcing member.

8. A thrust sliding bearing of claim 7, further comprising:
a seal member, which is placed between the upper case and the lower case, to isolate the annular space from outside.

* * * * *